United States Patent
Carlton et al.

(10) Patent No.: US 11,507,523 B1
(45) Date of Patent: Nov. 22, 2022

(54) TIMING CONTROL FOR DATA TRANSFER ACROSS A DATA INTERFACE

(71) Applicant: Google LLC, Mountain View, CA (US)

(72) Inventors: Brian Douglas Carlton, San Diego, CA (US); Saakar Mathur, San Francisco, CA (US); Richard John Shanks, Boulder, CO (US); Kang Lee, San Diego, CA (US); Conrad Smith, San Diego, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 17/544,131

(22) Filed: Dec. 7, 2021

(51) Int. Cl.
*G06F 13/20* (2006.01)

(52) U.S. Cl.
CPC ........ *G06F 13/20* (2013.01); *G06F 2213/16* (2013.01); *G06F 2213/40* (2013.01)

(58) Field of Classification Search
None
See application file for complete search history.

(56) References Cited

U.S. PATENT DOCUMENTS

| | | | | |
|---|---|---|---|---|
| 7,965,698 | B2* | 6/2011 | Jung | H04L 47/12 455/418 |
| 9,003,436 | B2* | 4/2015 | Tidwell | H04N 21/4667 709/224 |
| 2002/0136071 | A1* | 9/2002 | You | G11C 29/50 365/201 |
| 2004/0123060 | A1* | 6/2004 | Bodas | G06F 13/4243 711/167 |
| 2009/0129208 | A1* | 5/2009 | Weiss | G04R 20/00 368/56 |
| 2011/0219203 | A1 | 9/2011 | Nurminen et al. | |
| 2018/0329828 | A1* | 11/2018 | Apfelbaum | G06F 12/1009 |

OTHER PUBLICATIONS

Lee et al., "Adaptive-Latency DRAM (AL-DRAM)", Safari Technical Report No. 2016-003, Mar. 28, 2016, arxiv.org, arXin:1603.0845v1, 6 pages.

* cited by examiner

*Primary Examiner* — Elias Mamo
(74) *Attorney, Agent, or Firm* — Dority & Manning, P.A.

(57) ABSTRACT

Systems and methods for time control for a data interface between a source device and a receiving device are provided. In one example, a method can include performing a capture time sweep process at the receiving device. The capture time sweep process includes performing a plurality of test data transfers at the receiving device at a plurality of different capture time settings. The method can include determining a capture time window based at least in part on the capture time sweep process. The capture time window can be defined as a duration between a first capture time and a second capture time. The method can include determining a selected capture time between the first capture time and the second capture time. The method can include controlling data transfer across the data interface based at least in part on the selected capture time.

20 Claims, 10 Drawing Sheets

TIMING CONTROL FOR DATA TRANSFER ACROSS A DATA INTERFACE

FIELD

The present disclosure relates generally to timing control for data transfer across a data interface, such as a data interface between a processor and a memory.

BACKGROUND

Data interfaces (e.g., buses) can be used to transfer data between a source device and a receiving device. For instance, a data interface can be used to read and/or write data between a processor and a memory. In some cases, the data transfer from the source device and the sampling of data at the receiving device can be implemented based on one or more clock signals (e.g., using a rising edge and a falling edge of one or more clock signals). The speed of the data transfer can be dependent on the frequency of the clock signals. In general, a higher frequency clock will give higher data transfer speed.

SUMMARY

Aspects and advantages of embodiments of the present disclosure will be set forth in part in the following description, or can be learned from the description, or can be learned through practice of the embodiments.

One example embodiment of the present disclosure is directed to a method for capture time control for a data interface between a source device and a receiving device. The method can include performing a capture time sweep process at the receiving device, wherein the capture time sweep process includes performing a plurality of test data transfers at the receiving device at a plurality of different capture time settings. The method can include determining a capture time window based at least in part on the capture time sweep process. The capture time window can be defined as a duration between a first capture time and a second capture time. The first capture time can be defined based at least in part on an earliest capture time where a first threshold of a plurality of test data transfers are without errors. The second can be defined based at least in part on a latest capture time where a second threshold of a plurality of test data transfers are without errors. The method can include determining a selected capture time between the first capture time and the second capture time. The method can include controlling data transfer across the data interface based at least in part on the selected capture time.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
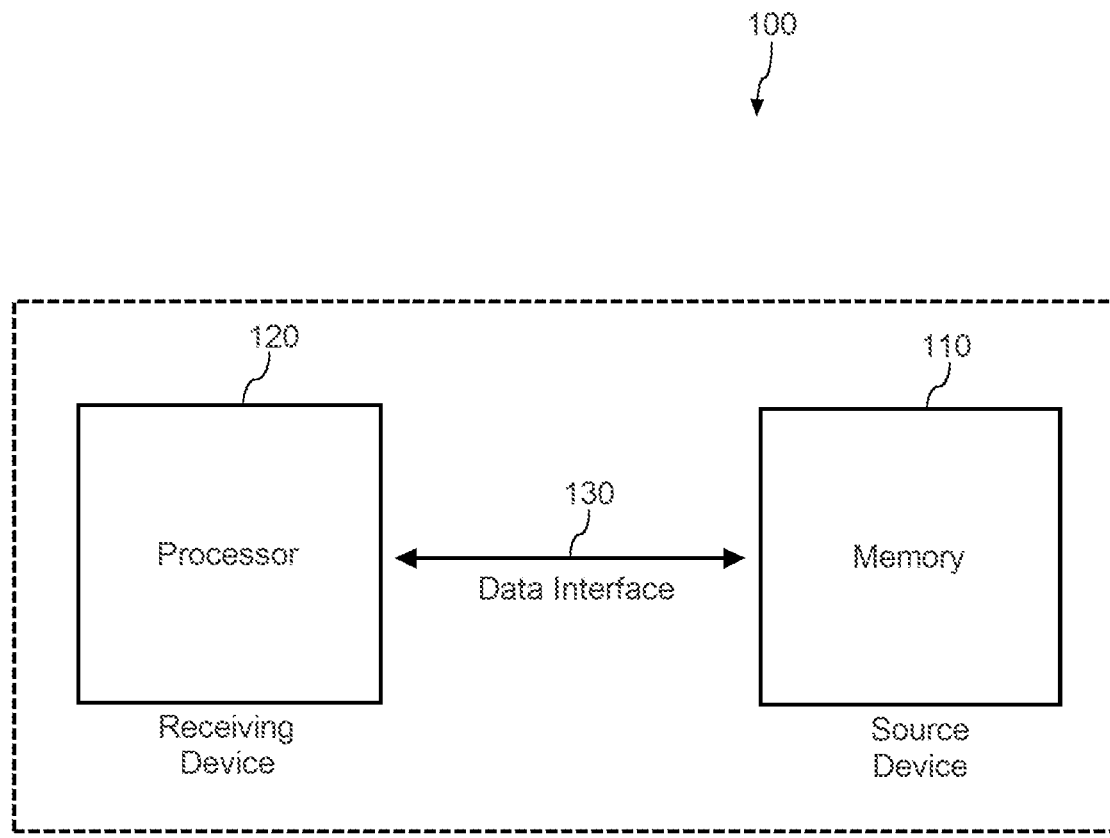
FIG. 1 depicts an example system according to example embodiments of the present disclosure.

Reference now will be made in detail to embodiments of the present disclosure, one or more examples of which are illustrated in the drawings. Each example is provided by way of explanation of the present disclosure, not limitation of the present disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to timing control for data transfer across a data interface (e.g., bus), such as a data interface between a processor and a memory. In some instances, sampling data using a rising edge or a falling edge of a clock at the data interface can lead to undesirable results. This can be particularly challenging in situations where a total reading time and/or writing time from a source device (e.g., a memory) plus setup time and hold time at a receiving device (e.g., a processor) exceeds the duration of one clock cycle. As a result, reads and/or writes of data across the data interface may not be reliable. Slower clock frequencies and/or wait states can be implemented to address these concerns. However, this can result in slower processing speeds, leading to reduced performance of a device.

In some data transfer systems, data transfer from a source device (e.g., a memory) and a receiving device (e.g., a processor) can occur over a data interface pursuant to a data interface clock signal operating at an operating frequency (e.g., 8 MHz or greater). Data transfer operations (e.g., read operations) from the source device can be initiated at a rising edge and/or a falling edge of the interface clock signal. Capture times at the receiving device can occur at a rising edge and/or a fall edge of a sampling clock signal at the receiving device. The sampling clock signal and the interface clock signal can have the same operating frequency (e.g., 8 MHz, 12 MHz, 24 MHz, 48 MHz, 96 MHz).

However, rising edges and falling edges of the sampling clock signal and the interface clock signal may not be aligned (e.g., may not be synchronous).

Various timing parameters can govern the transfer of data in the system. For instance, a read time can be defined as the time from an edge of the data interface clock (e.g., rising edge or falling edge) to the time the data is valid to be read for transfer (e.g., to the receiving device). An output hold time is a time before which data does not change at the source device before reading the data from the source device. The input setup time is a time for which the data should be valid before an edge of the sampling clock at the receiving device. The input hold time is the time for which the data should be valid after the edge of the sampling clock. The capture time is defined as the time of the edge of the sampling clock between the input setup time and the input hold time.

According to example aspects of the present disclosure, a sampling clock of the receiving device (e.g., processor) can be adjusted such that the capture time (e.g., rising edge or falling edge) occurs at a time to reduce errors in the data transfer over the data interface between the source device and the receiving device. The capture time can be selected to be at a time relative to the data interface clock based on test data indicating that the capture time will result in reduced or zero errors.

More particularly, in some embodiments, a capture time sweep process can be performed at the receiving device. The capture time sweep process can include performing a plurality of test data transfers at the receiving device at a plurality of different capture time settings. For instance, the capture time can be incrementally adjusted through a window in fixed regular or irregular increments. In some embodiments, each increment can be less than half of a clock cycle, such as less than 25% of a clock cycle, such as less than 10% of a clock cycle, such as less than 5% of a clock cycle, such as less than 1% of a clock cycle. In some embodiments, the capture time can be incrementally adjusted in about 200 picosecond increments or less, such as about 100 picosecond increments or less. In some embodiments, the capture time can be adjusted past a normal next edge of a clock cycle associated with the data interface and/or receiving device. At each capture time, a plurality of data transfers can be conducted (e.g., 500 or more data transfers, such as 1000 or more data transfers). Data can be obtained indicating whether each data transfer was with error or without error.

Based on the test data, a capture time window can be determined. The capture time window can be defined as a duration between a first capture time and a second capture time. The first capture time can be defined as an earliest capture time where a threshold (e.g., 85%, 90%, 100%) of the plurality of test data transfers occurs without error. The second capture time can be defined as a latest capture time where a threshold (e.g., 85%, 90%, 100%) of the plurality of test data transfers occurs without error. A selected capture time can be selected to be a time that occurs between the first capture time and the second capture time (e.g., at a midpoint time between the first capture time and the second capture time).

As referred to herein, the terms "first," "second," "third," etc. can be used interchangeably to distinguish one component or entity from another and are not intended to signify location, functionality, or importance of the individual components or entities. For instance, "first" capture time and "second" capture time are intended to distinguish the times from one another and not to signify any particular order or sequence.

The data exchange across the data interface can be controlled based at least in part on the selected capture time. For instance, the receiving device can be configured (e.g., programmed) to sample data at the selected capture time. For instance, the selected capture time can be written into a non-volatile memory associated with the receiving device. The receiving device can be operated in accordance with the selected capture time.

In some embodiments, the method can be implemented for a device at startup of the system. For instance, a selected capture time can be determined in accordance with example aspects of the present disclosure during each startup of the system including the receiving device and the source device. In this way, the operation of the receiving device can be controlled in accordance with a selected capture time determined at each startup of the device. In some embodiments, the method is implemented for a device during the fabrication process. For instance, the method can be implemented to configure the device with timing control aspects as part of fabrication of the device.

In some embodiments, the methods and systems according to example aspects of the present disclosure can obtain data indicative of a threshold variability window. The threshold variability window can be defined based on a statistical analysis of a plurality of data transfers across many different devices and/or different operating conditions. For instance, a capture time sweep process test can be performed for multiple devices on multiple different system boards. The capture time sweep process can be performed at different operating conditions for each device. For instance, the capture time sweep process can be performed at room temperature, at a low temperature (e.g., less than 0° C.) and/or at a high temperature (e.g., greater than 100° C.). In some embodiments, the different operating temperatures can be selected based on operating temperature ranges of a device that will incorporate the receiving device. For instance, for a wearable computing device application, the operating temperatures can be less than 0° C. for low temperature and about 50° C. for high temperature. In some embodiments, the different operating conditions can be different operating voltages.

Data indicative of capture times where a threshold of the data transfers were without error (e.g., or a threshold were with error) can be analyzed to determine a variability of capture times that are acceptable across all of the different devices and/or different operating conditions. For instance, minimum, maximum, and standard deviation of the earliest capture time and the latest capture time where the data transfer was without error across multiple devices can be determined as run-to-run variation. Minimum, maximum, and standard deviation of the earliest capture time and the latest capture time the data transfer was without error across multiple operating conditions (e.g., different operating temperatures, different operating voltages) can be determined as operating condition variation. The run-to-run variation and/or the operating condition variation can be used to determine the threshold variability window.

The threshold variability window can be compared with the capture time window determined for a receiving device according to example aspects of the present disclosure. For instance, in some embodiments, if the capture time window of the receiving device is smaller than the threshold variability window, the receiving device can be "failed" and taken out of production. Otherwise, a selected capture time for the receiving device can be determined based on the capture time window for the receiving device. The receiving device can be configured according to the selected capture time.

In some embodiments, the receiving device can be a processor, such as a microprocessor or microcontroller. The source device can be a memory. For instance, the memory can be NOR, NAND, MRAM, pSRAM, SRAM, eMMC, DRAM or other memory. The data interface (e.g., bus) can be SPI, dual SPI, quad SPI, octal SPI, parallel interface (with or without multiplexed address and data), ONSI, eMMC, or other clocked interface. The data interface can be single data rate or double data rate. The processor, memory, and data interface can be located on a single board or multiple connected boards. The processor may be in communication with multiple memories with multiple data interfaces without deviating from the scope of the present disclosure.

Aspects of the present disclosure are discussed with reference to data transfer among a processor and a memory for purposes of illustration and discussion. Those of ordinary skill in the art, using the disclosure provided herein, will understand that aspects of the present disclosure can be used to control the transfer of data between a source device and a receiving device across a data interface without deviating from the scope of the present disclosure. For instance, the receiving device can be, for instance, a network interface chip or other integrated circuit.

Aspects of the present disclosure are discussed with reference to adjusting a capture time of a receiving device for purposes of illustration and discussion. Those of ordinary skill in the art, using the disclosures provided herein, will understand that timing control according to aspects of the present disclosure can also be accomplished by adjusting a transmit time of a source device and/or receiving device without deviating from the scope of the present disclosure. In this regard, use of the term "capture time" in this application, including the claims is intended to refer to a time where a receiving device captures data from a data interface as well as a time where a device transmits data via the data interface (e.g., during a write operation).

Example aspects of the present disclosure provide a number of technical effects and benefits and lead to improvements in computing technology. For instance, controlling a receiving device based on selected capture times according to example aspects of the present disclosure can allow for operation at higher frequency clock speeds with reduced or zero data transfer errors. This can lead to faster processing times and improved performance of the system. As a result, computing devices, such as wearable computing devices, incorporating a receiving device configured according to example aspects of the present disclosure can provide increased functionality without having to reduce core functionality of the device.

As used herein, the use of the term "about" in conjunction with a numerical value refers to within 10% of the indicated numerical value.

FIG. 1 depicts an example system 100 according to example aspects of the present disclosure. The system 100 includes a source device 110. The source device 110 can be a memory. For instance, in some embodiments, the source device 110 can be NOR, NAND, MRAM, pSRAM, SRAM, eMMC, DRAM or other memory. The system 100 can include a receiving device 120. The receiving device 120 can be a processor. The processor can be any suitable processing device, such as a microprocessor, microcontroller, CPU, GPU, integrated circuit, or other suitable processing device. The receiving device 120 can be other devices without deviating from the scope of the present disclosure, such as a network interface chip or other integrated circuit.

The system 100 can include a data interface 130. The data interface 130 can facilitate data transfer between the source device 110 and the receiving device 120. The data interface can be SPI, dual SPI, quad SPI, octal SPI, parallel interface (with or without multiplexed address and data), ONSI, eMMC, or other clocked interface. The data interface can be single data rate or double data rate. The system 100 can be implemented on a single board or a plurality of connected boards.

As an example, the data interface 130 can be used by the receiving device 120 to read data from the source device 110. Example aspects of the present disclosure are discussed with reference to a data transfer that is a read operation between the source device 110 and the receiving device 120. However, those of ordinary skill in the art, using the disclosures provided herein, will understand that aspects of the present disclosure are applicable to a write operation between the receiving device 120 and the source device 110. In this case, the receiving device can be a memory and the source device can be a processor, network interface, or other suitable chip or integrated circuit.

That data transfer over the data interface 130 can be based on or more clock signals (e.g., can be a clocked data transfer). For instance, read operations at the source device can occur based on a first clock signal associated with the source device 110 and/or the data interface 130. For instance, read operations at the source device 110 can be based on timing from rising and/or falling edges of the first clock signal. The first clock signal can have a frequency, such as 8 MHz or greater, such as 12 MHz or greater, such as 24 MHz or greater, such as 48 MHz or greater, such as 96 MHz or greater.

Read operations at the receiving device 120 can be based on a second clock signal (e.g., a sampling clock) at the receiving device 120. Capture times for reading data at the receiving device 120 can occur at rising and/or falling edges of the second clock signal. The second clock signal can have a frequency, such as 8 MHz or greater, such as 12 MHz or greater, such as 24 MHz or greater, such as 48 MHz or greater, such as 96 MHz or greater. The frequency of the first clock signal can be the same as the frequency of the second clock signal. In some embodiments, the rising and/or falling edges of the first clock signal may not be synchronous (e.g., do not occur at the same time) as the rising and/or falling edges of the second clock signal.

Example aspects of the present disclosure are discussed with reference to a system providing for data transfer between a processor and a memory. Those of ordinary skill in the art, using the disclosures provided herein, will understand that aspects of the present disclosure are applicable to controlling the timing of any clocked data transfer between a source device and a receiving device, such as a between a network interface and another device.

Figure 2:
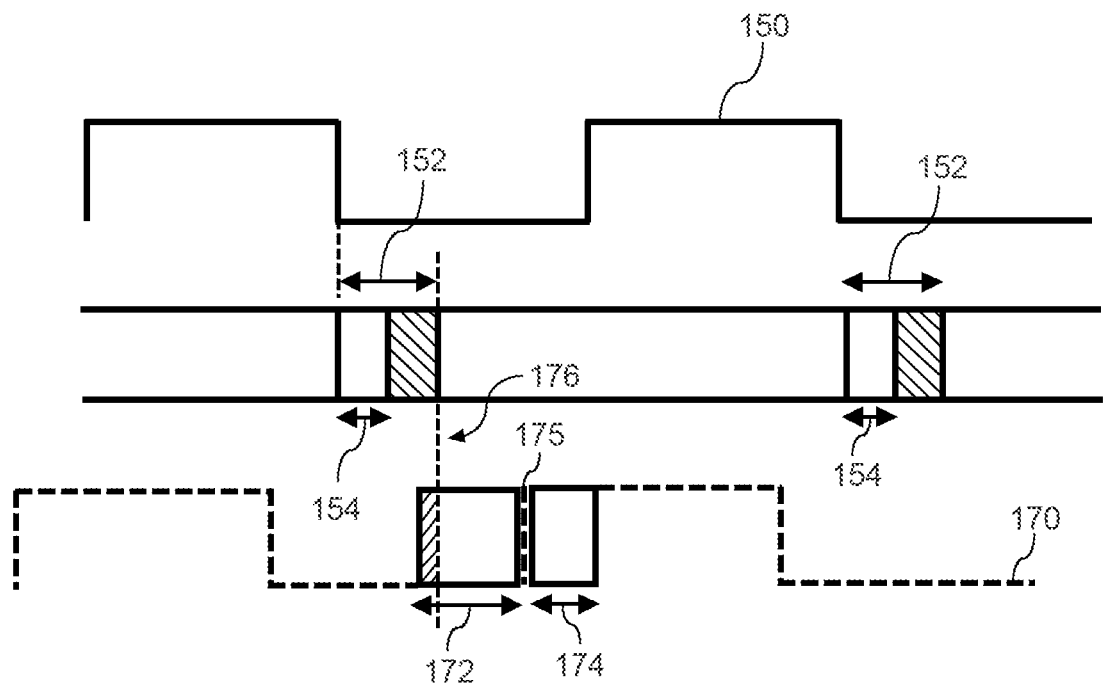
FIGS. 2-3 depict example clock timing diagrams associated with data transfer in an example system according to example embodiments of the present disclosure.
Figure 3:
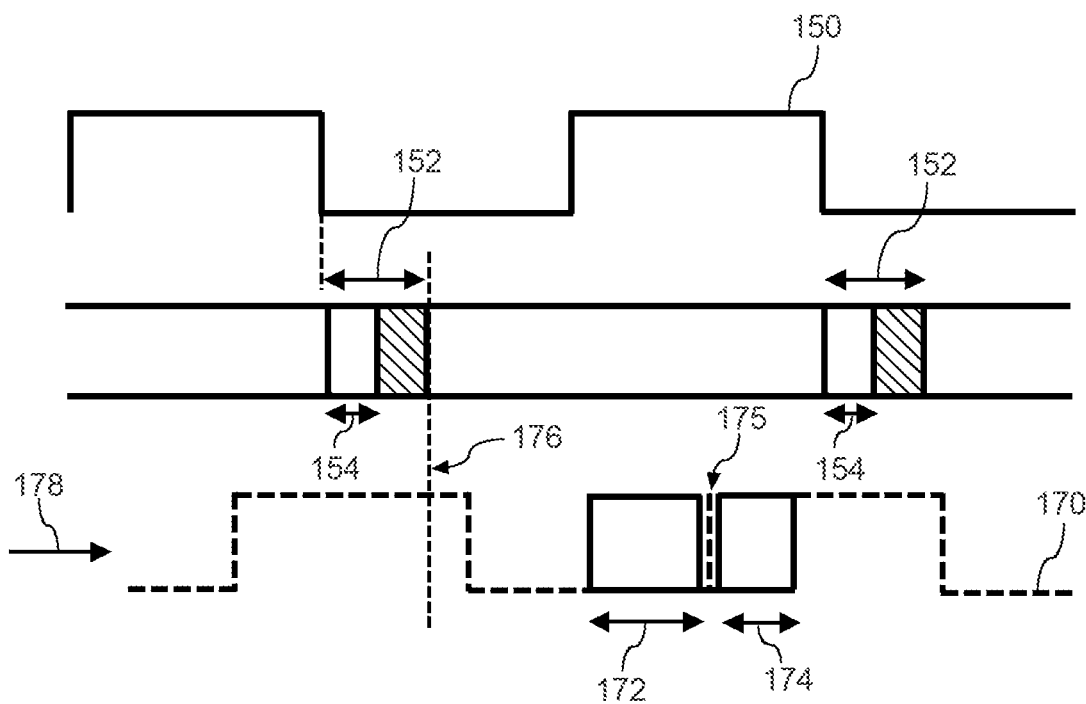

FIGS. 2-3 depict aspects of an example clocked data transfer that can be implemented in system 100. More particularly, FIG. 2 depicts a first clock signal 150 and a second clock signal 170. The first clock signal 150 can be associated with, for instance, source device 110 and/or data interface 130. The second clock signal 170 can be associated with, for instance, sampling of the data interface 130 by the receiving device 120.

As shown in FIG. 2, a read time 152 is the time from a falling edge of the first clock signal 150 until the data is read from the source device. Output hold time 154 is the time that data at the source device remains the same before reading the data from the source device. As further shown in FIG. 2, a capture time 175 occurs at a rising edge of the second clock signal 170. Prior to the capture time 175, an input setup time 172 is required for which data should be valid before the capture time 175 (e.g., rising edge of the second clock signal 170). Also illustrated is input hold time 174, which is an amount of time for which data should be valid after the capture time 175 (e.g., rising edge of the second clock signal 170). As shown in FIG. 2, the capture time 175 is not a sufficient duration of time after the time 176 because there is not enough time for the requisite input setup time 172 before the capture time 175. As a result, the capture time settings depicted in FIG. 2 (e.g., the location of the rising edge of the second clock signal 170) can result in data transfer error.

In FIG. 3, the capture time 175 has been shifted to a later time by shifting the second clock signal 170 as indicated by arrow 178. As shown, the capture time 175 occurs at a location where there is sufficient time after time 176 to accommodate the requisite input setup time 172 before the capture time 175. In addition, the capture time 175 occurs at a location where there is sufficient time before the start of the next read cycle to accommodate the requisite input hold time 174. As a result, the capture time settings depicted in FIG. 3 (e.g., the location of the rising edge of the second clock signal 170) can result in reduced data transfer error.

Example aspects of the present disclosure are directed to systems and methods for configuring a receiving device (e.g., receiving device 120 of FIG. 1) such that the capture time occurs at locations where there is reduced likelihood of data transfer errors (e.g., as depicted in FIG. 3). This can be accomplished by implementing a delay in the sampling clock or otherwise adjusting the timing of the rising edges and/or falling edges of the sampling clock (e.g., without adjusting the frequency of the sampling clock).

Figure 4:
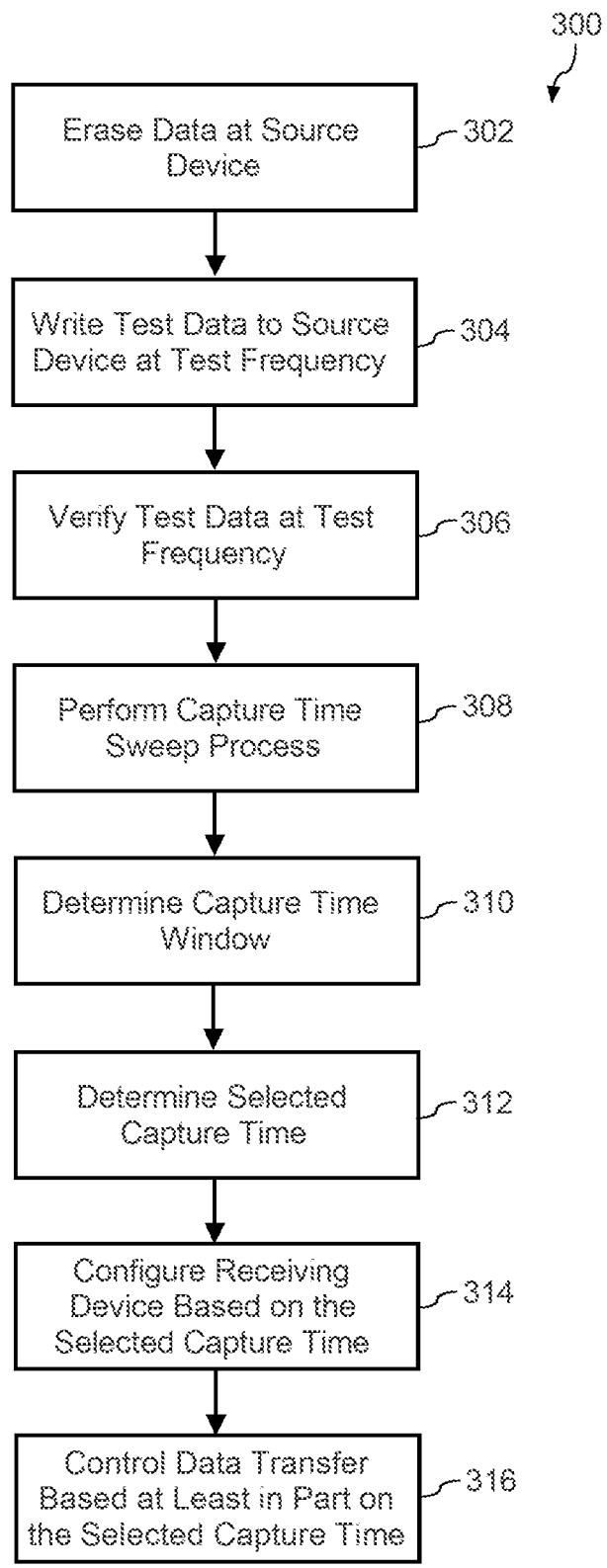
FIG. 4 depicts a flow diagram of an example method for capture time control according to example embodiments of the present disclosure.

FIG. 4 depicts a flow diagram of an example method 300 according to example embodiments of the present disclosure. The method 300 may be implemented using, for instance, the system 100 discussed above with reference to FIG. 1. FIG. 4 depicts operations performed in a particular order for purposes of illustration and discussion. Those of ordinary skill in the art, using the disclosures provided herein, will understand that various operations or steps of the method 300 or any of the other methods disclosed herein may be adapted, modified, rearranged, performed simultaneously, include operations not illustrated, and/or modified in various ways without deviating from the scope of the present disclosure.

At 302, the method 300 can include erasing data at a source device. For instance, all data stored at a source device can be erased. This will allow the writing of test data to the source device.

At 304, the method 300 can include writing test data to the source device at a test frequency. The test data can be known data that can be used to verify whether data transfers occur without error. In some embodiments, the test frequency is less than an operating frequency of the system. For instance, the operating frequency of the system can be 8 MHz or greater, such as 12 MHz or greater, such as 24 MHz or greater, such as 48 MHz or greater, such as 96 MHz or greater. The test frequency can be less than the operating frequency. Writing the data at a lower test frequency can ensure there is enough time between clock cycles for read time and output hold time as well as input setup time and input hold time, regardless of capture time setting for the system.

At 306, the method 300 can include verifying the test data at the test frequency. For instance, the method can include reading the data from the source device to determine if the data can be read without errors. Reading the data at a lower test frequency can ensure there is enough time between clock cycles for read time and output hold time as well as input setup time and input hold time, regardless of capture time setting for the system. If the data can be read without errors, the test data can serve as "ground truth" during subsequent operations (e.g., capture time sweep processes).

At 308, the method 300 can include performing a capture time sweep process. The capture time sweep process involves incrementally adjusting the capture time setting (e.g., in picosecond intervals) and performing a plurality of data transfers (e.g., such as 500 or more data transfers, such as 1000 or more data transfers) at each capture time setting. The capture time sweep process can determine for each capture time setting whether the data transfer occurred without a threshold number of errors (e.g., was good) or had a threshold number of errors (e.g., was not good). In some embodiments, the threshold can be set such that greater than 85% of data transfers occur without error, such as greater than 90% of data transfers occur without error, such as greater than 95% of data transfers occur without error, such as greater than 97.5% of data transfers occur without error, such as 100% of data transfers occur without error In some embodiments, a capture time sweep process can include adjusting a capture time for the plurality of test data transfers at the receiving device to a first capture time. The capture time sweep process can include performing the plurality of test data transfers (e.g., 500 or more data transfers, such as 1000 or more data transfers) based at least in part on the first capture time. The capture time sweep process can include adjusting the capture time for the plurality of test data transfers at the receiving device to a second capture time. The capture time sweep process can include performing the plurality of test data transfers based at least in part on the first capture time. This can be repeated for many capture time settings.

Figure 5:
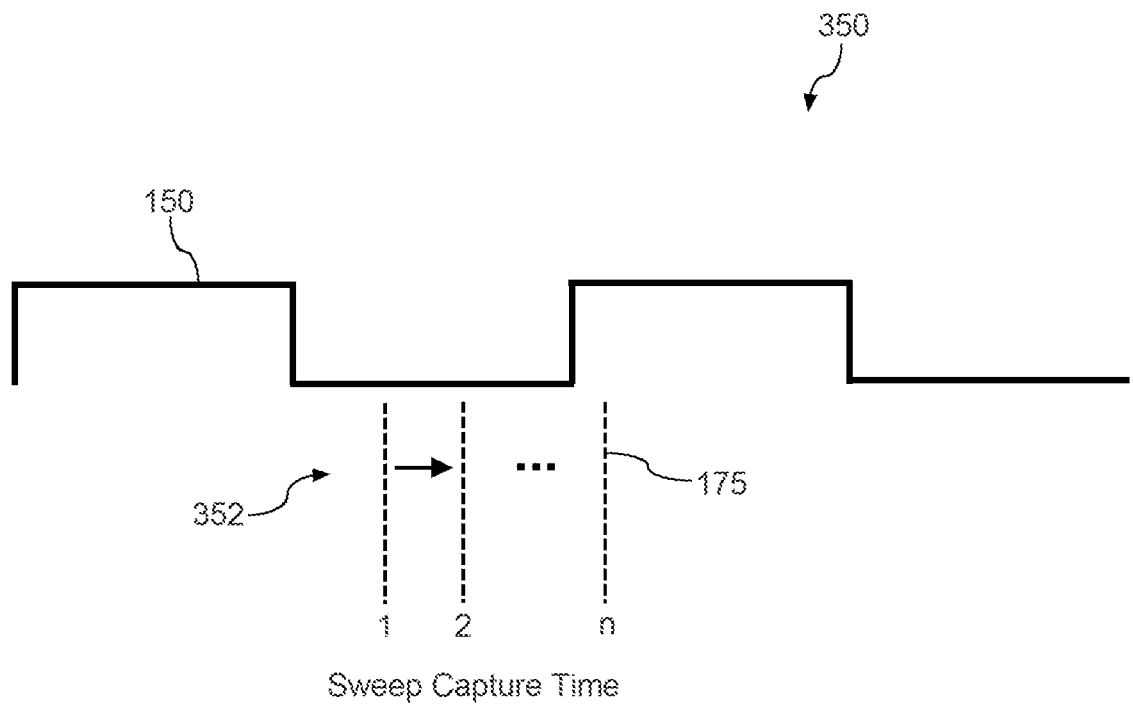
FIG. 5 depicts an example capture time sweep process according to example embodiments of the present disclosure.

FIG. 5 illustrates an example capture time sweep process 350 according to example embodiments of the present disclosure. As shown, the capture time sweep process can incrementally shift capture times 175 relative to a clock signal associated with data interface and/or source device as indicated by arrow 352. The capture times 175 can be associated with an edge of a sampling clock signal associated with the receiving device. As shown, the capture time 175 can be shifted from a first capture time to a second capture time. In some embodiments, each increment can be less than half of a clock cycle, such as less than 25% of a clock cycle, such as less than 10% of a clock cycle, such as less than 5% of a clock cycle, such as less than 1% of a clock cycle. In some embodiments, the capture time can be incrementally adjusted in about 200 picosecond increments or less, such as about 100 picosecond increments or less. In some embodiments, the capture time can be incrementally adjusted in increments of greater than 200 picoseconds. The capture time 175 can be shifted n times as part of the capture time sweep process. In some embodiments, the capture time can be adjusted past a normal next edge of a clock cycle associated with the data interface and/or receiving device A plurality of test data transfers can be implemented at each of the capture times 175.

Referring to FIG. 4 at 310, the method 300 can include determining a capture time window. The capture time window can be determined based on the plurality of data transfers occurring at each of the capture times during the capture time sweep process. In some embodiments, the capture time window can be defined as a duration between a first capture time and a second capture time. The first capture time can be defined based at least in part on an earliest capture time where a first threshold of a plurality of test data transfers (e.g., 85%, 90%, 95%, 97.5% or 100%) are without error. The second capture time can be defined at least in part on a latest capture time where a second threshold of a plurality of test data transfers are without error (e.g., 85%, 90%, 95%, 97.5% or 100%).

Figure 6:
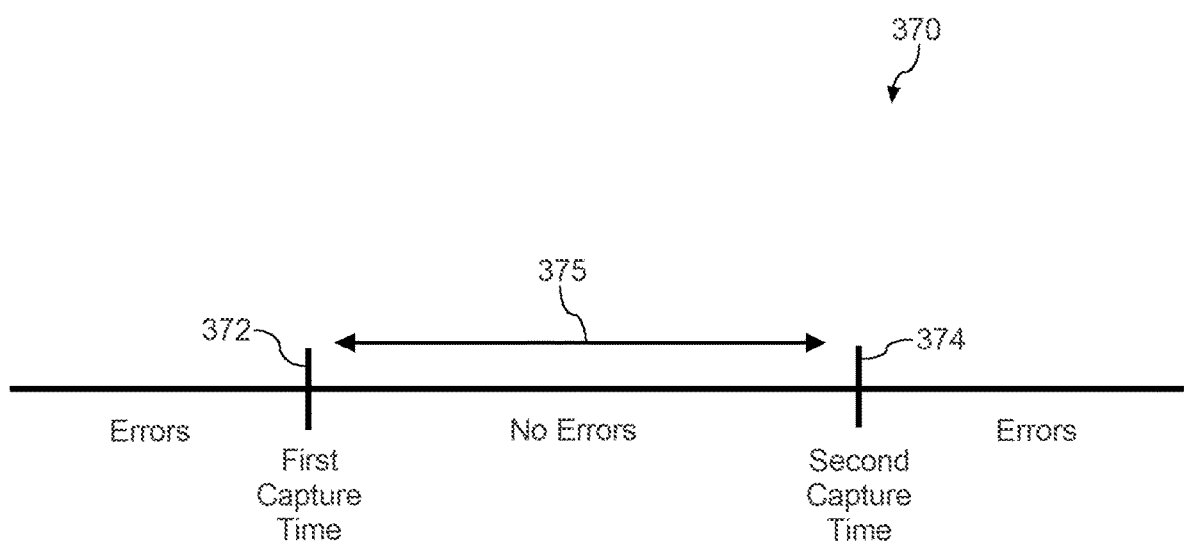
FIG. 6 depicts an example capture time window according to example embodiments of the present disclosure.

FIG. 6 depicts an example capture time window 370 according to example embodiments of the present disclosure. The capture time window 370 can be defined as the duration 375 of time between a first capture time 372 and a second capture time 374. The first capture time 372 can be defined as the earliest capture time where a first threshold of a plurality of test data transfers (e.g., 85%, 90%, 95%, 97.5% or 100%) are without error. The second capture time 374 is a latest capture time where a second threshold of a plurality of test data transfers are without error (e.g., 85%, 90%, 95%, 97.5% or 100%). For instance, as shown in FIG. 6, the capture time window 370 can include a duration 375 where there are no errors in data transfers. Errors in data transfers occur outside of the duration 375 (e.g., at capture times earlier than the first capture time 372 or at capture times later than the second capture time 374).

Referring to FIG. 4 at 312, the method 300 can include determining a selected capture time from the capture time window determined at 310. The selected capture time can be a time between the first capture time and the second capture time of the capture time window. For instance, the selected capture time can be at a midpoint between the first capture time and the second capture time. The selected capture time can be at other times in the capture time window without deviating from the scope of the present disclosure. For instance, the selected capture time could be selected to be closer to the first capture relative to the second capture time. In some embodiments, the selected capture time could be selected to be closer to the second capture time relative to the first capture time.

At 314, the method 300 can include configuring the receiving device based at least in part on the selected capture time. For instance, the method can include data associated with a selected capture time in a non-volatile memory associated with the receiving device. The method can include controlling the receiving device based on the data associated with the selected capture time. In some embodiments, the receiving device can be configured to implement a delay in the sampling clock signal. For instance, one or more bits or other parameters associated with operation of the receiving device can be set to implement a delay in the sampling clock signal to adjust the capture time to be the selected capture time.

At 316, the method 300 can include controlling data transfer based at least in part on the selected capture time. More particularly, the data transfer between the source device and the receiving device can be implemented based on the selected capture time, such as illustrated in FIG. 3.

In some embodiments, the method 300 can be implemented for a device at startup of the system. For instance, a selected capture time can be determined in accordance with example aspects of the present disclosure during each startup of the system. In this way, the operation of the receiving device can be controlled in accordance with a selected capture time determined at each startup of the device.

In some embodiments, the methods and systems according to example aspects of the present disclosure can obtain data indicative of a threshold variability window. The threshold variability window can be defined based on a statistical analysis of a plurality of data transfers across many different devices and/or different operating conditions. For instance, a capture time sweep process test can be performed for multiple devices on multiple different system boards. The capture time sweep process can be performed at different operating conditions for each device. For instance, the capture time sweep process can be performed at room temperature, at a low temperature (e.g., less than 0° C.) and/or at a high temperature (e.g., greater than 100° C.). In some embodiments, the operating temperatures can be selected based on operating temperature ranges of a device that will incorporate the receiving device. For instance, for a wearable computing device application, the operating temperatures can be less than 0° C. for low temperature and about 50° C. for high temperature. In some embodiments, the different operating conditions can be different operating voltages.

Data indicative of capture times where a threshold of the data transfers were without error (e.g., or a threshold were with error) can be analyzed to determine a variability of capture times that are acceptable across all of the different devices and/or different operating conditions. For instance, minimum, maximum, and standard deviation of the earliest capture time and the latest capture time where the data transfer was without error across multiple devices can be determined as run-to-run variation. Minimum, maximum, and standard deviation of the earliest capture time and of the latest capture time the data transfer was without error across multiple operating conditions (e.g., different operating temperatures, different operating voltages) can be determined as operating condition variation. The run-to-run variation and/or the operating condition variation can be used to determine the threshold variability window.

The threshold variability window can be compared with the capture time window determined for a receiving device according to example aspects of the present disclosure. For instance, in some embodiments, if the capture time window of the receiving device is smaller than the threshold variability window, the receiving device and/or the source device can be "failed" and taken out of production. Otherwise, a selected capture time for the receiving device can be determined based on the capture time window for the receiving device. The receiving device can be configured according to the selected capture time.

Figure 7:
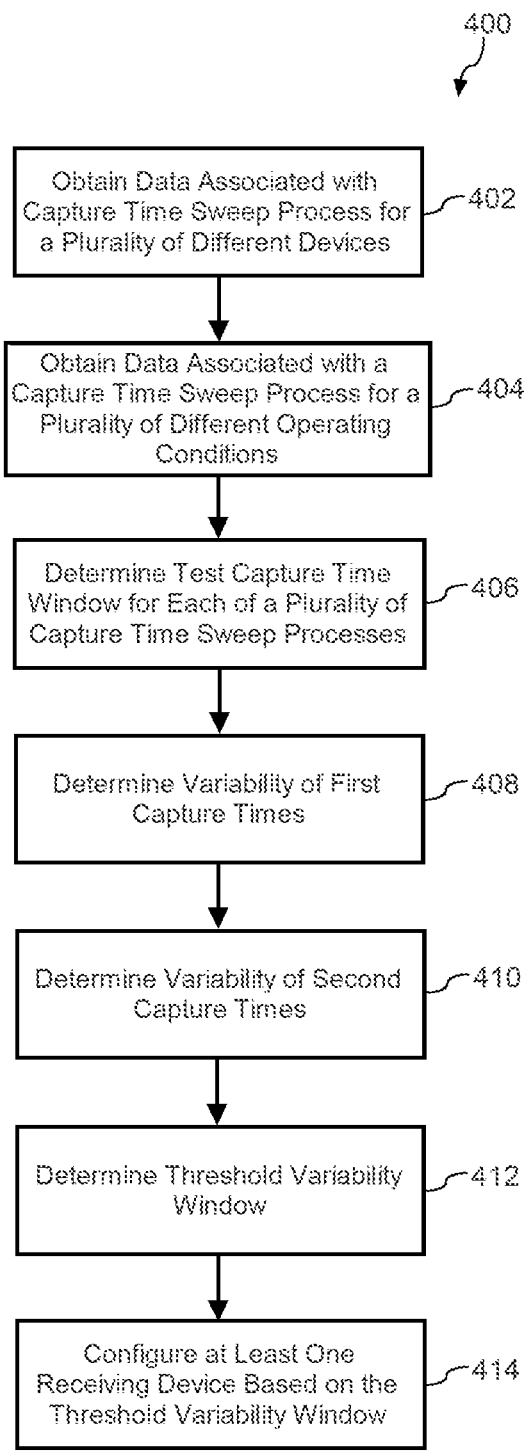
FIG. 7 depicts a flow diagram of an example method according to example embodiments of the present disclosure.

FIG. 7 depicts a flow diagram of an example method 400 (e.g., a test process for generating a threshold variability window) according to example embodiments of the present disclosure. The method 400 may be implemented at least in part on system 100 of FIG. 1 and/or using, for instance, the system 700 discussed with reference to FIG. 11. FIG. 7 depicts operations performed in a particular order for purposes of illustration and discussion. Those of ordinary skill in the art, using the disclosures provided herein, will understand that various operations or steps of the method 400 or any of the other methods disclosed herein may be adapted, modified, rearranged, performed simultaneously, include operations not illustrated, and/or modified in various ways without deviating from the scope of the present disclosure.

At 402, the method 400 can include obtaining data associated with test capture time sweep processes for a plurality of different devices. More particularly, the capture time sweep process can be performed as described with references to FIGS. 4-6 for a plurality of different devices.

The data associated with the test capture time sweep process can be indicative of the latest test capture time and earliest test capture times a test threshold number (e.g., 85%, 90%, 95%, 97.5% or 100%) of data transfers occurred without error. For instance, in some embodiments, data associated with the test capture time sweep process can be obtained for about 10 or more devices, such as about 20 or more devices, such as about 50 or more devices.

Figure 8:
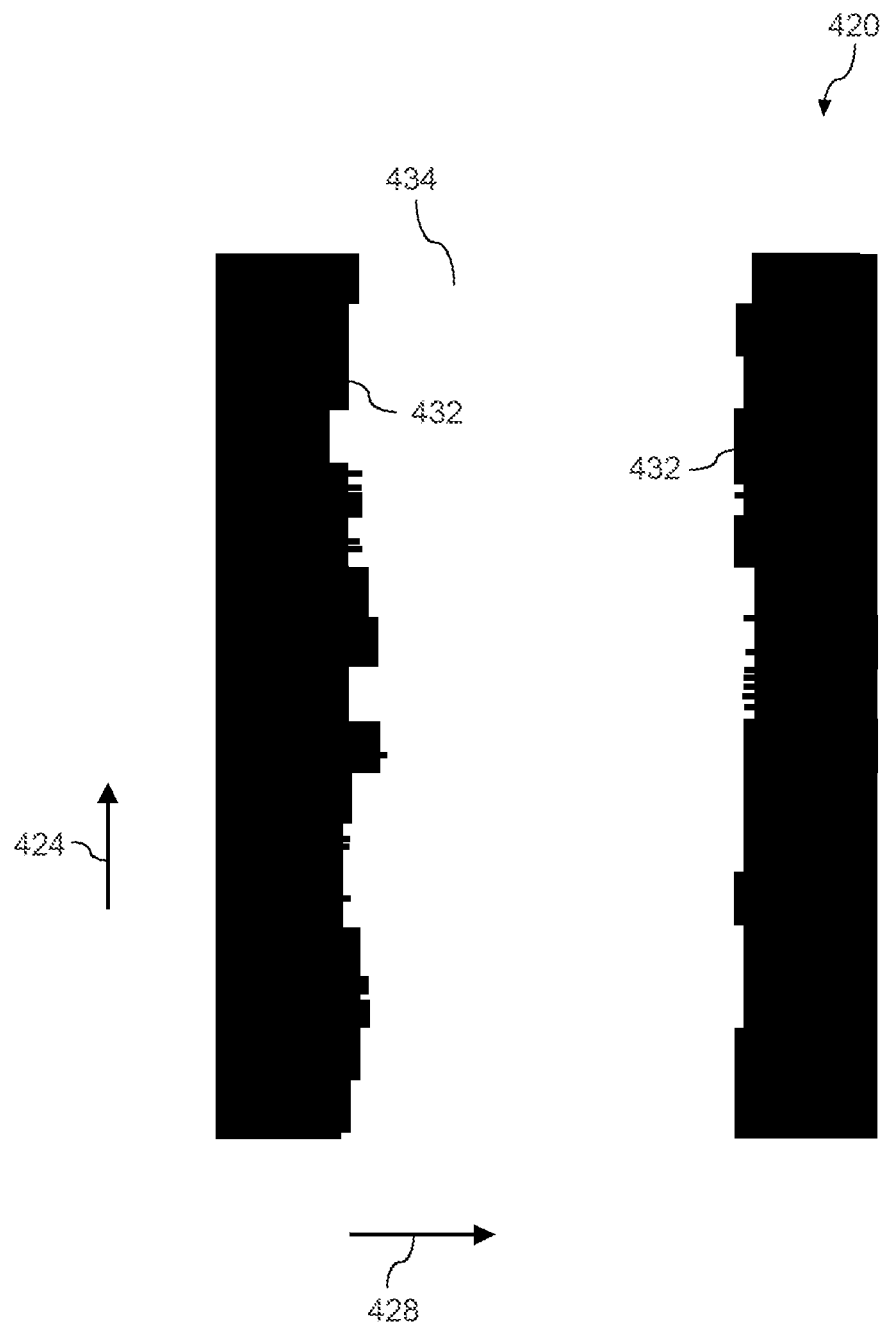
FIG. 8 depicts data associated with example capture time sweep processes according to example embodiments of the present disclosure.

FIG. 8 depicts a graphical representation of data 420 associated with test capture time sweep processes for a plurality of different devices according to example embodiments of the present disclosure. The data 420 plots capture time settings along the x-axis 428 and different devices along the y-axis 424. A dark-colored pixel 432 indicates that a data transfer occurred with error. A light-colored pixel 434 indicates that a data transfer occurred without error. As will be discussed in detail below, the data 420 can be analyzed to determine a variability of first and second capture times (where a threshold of data transfers occur without error) to determine a threshold variability window according to example aspects of the present disclosure. The analysis based on different devices can be referred to as run-to-run variation.

Referring to FIG. 7, in addition to and/or in the alternative to the 402, the method 400 at 404 can include obtaining data associated with test capture time sweep processes for a plurality of different operating conditions. The different operating conditions can be, for instance, different operating temperature conditions or different operating voltage conditions. More particularly, the test capture time sweep process can be performed as described with references to FIGS. 4-6 for a plurality of different operating conditions. The data associated with the test capture time sweep process can be indicative of the latest test capture times and earliest test capture times a test threshold number (e.g., 85%, 90%, 95%, 97.5% or 100%) of data transfers occurred without error.

For instance, in some embodiments, data associated with the test capture time sweep process can be obtained for low operating temperature, room operating temperature, and high operating temperature conditions. Low operating temperature conditions can be associated with operating a system at, for example, 0° C. or less. High operating temperature conditions can be associated with operating a system, for example, about 100° C. or greater). As will be discussed in detail below, the data can be analyzed to determine a variability of first and second capture times (where a threshold of data transfers occur without error) to determine a threshold variability window according to example aspects of the present disclosure. The analysis based on different operating conditions can be referred to as operating condition variation.

At 406, the method 400 can include determining test capture time windows for each of the plurality of test capture time sweep processes. More particularly, for each test capture time sweep process performed at 402 and/or 404, the method 400 can determine a first test capture time which is the earliest that a threshold number of data transfers occur without error and a second test capture time which the latest that a threshold number of data transfers occur without error. The test capture time window can be defined as the duration between the first test capture time and the second test capture time.

At 408, the method 400 can include determining a variability of the first test capture times. More particularly, analysis techniques can be performed on the first test capture times to determine a minimum first test capture time, a maximum first test capture time, an average (e.g., mean, median, and/or mode) first test capture time, and a standard deviation of the first test capture times. Other suitable measures of the variability of the first test capture times can be used without deviating from the scope of the present disclosure.

At 410, the method 400 can include determining a variability of second test capture times. Analysis techniques can be performed on the second test capture times to determine a minimum second test capture time, a maximum second test capture time, an average (e.g., mean, median, and/or mode) of the second test capture times, and a standard deviation of the second test capture times. Other suitable measures of the variability of the second test capture times can be used without deviating from the scope of the present disclosure.

At 412, the method 400 can include determining a threshold variability window. The threshold variability window can be defined based on the variability of the first test capture times and the second test capture times. The threshold variability window can be defined to encompass test capture times for data transfers that occur without error taking into account the variability of the first test capture times and second test capture times in run-to-run variation and/or operating condition variation.

For instance, in some embodiments, a threshold variability window can be defined as a duration between a first threshold capture time and a second threshold capture time. The first threshold capture time can be defined based on the variability of the first test capture times. For instance, the first threshold capture time can be defined as occurring at or later than a time within 6 standard deviations of the mean of the first test capture times or another suitable threshold. The second threshold capture time can be defined based on the variability of the second test capture times. For instance, the first threshold capture time can be defined as occurring at or earlier than a time within 6 standard deviations of the mean of the second test capture times or another suitable threshold.

At 414, the method 400 can include configuring at least one receiving device based at least in part on the threshold variability window. For instance, the method 400 can include failing at least one receiving device based at least in part on the threshold variability window. Details concerning one example implementation of configuring at least one receiving device based at least in part on the threshold variability window are discussed with reference to FIG. 9.

Figure 9:
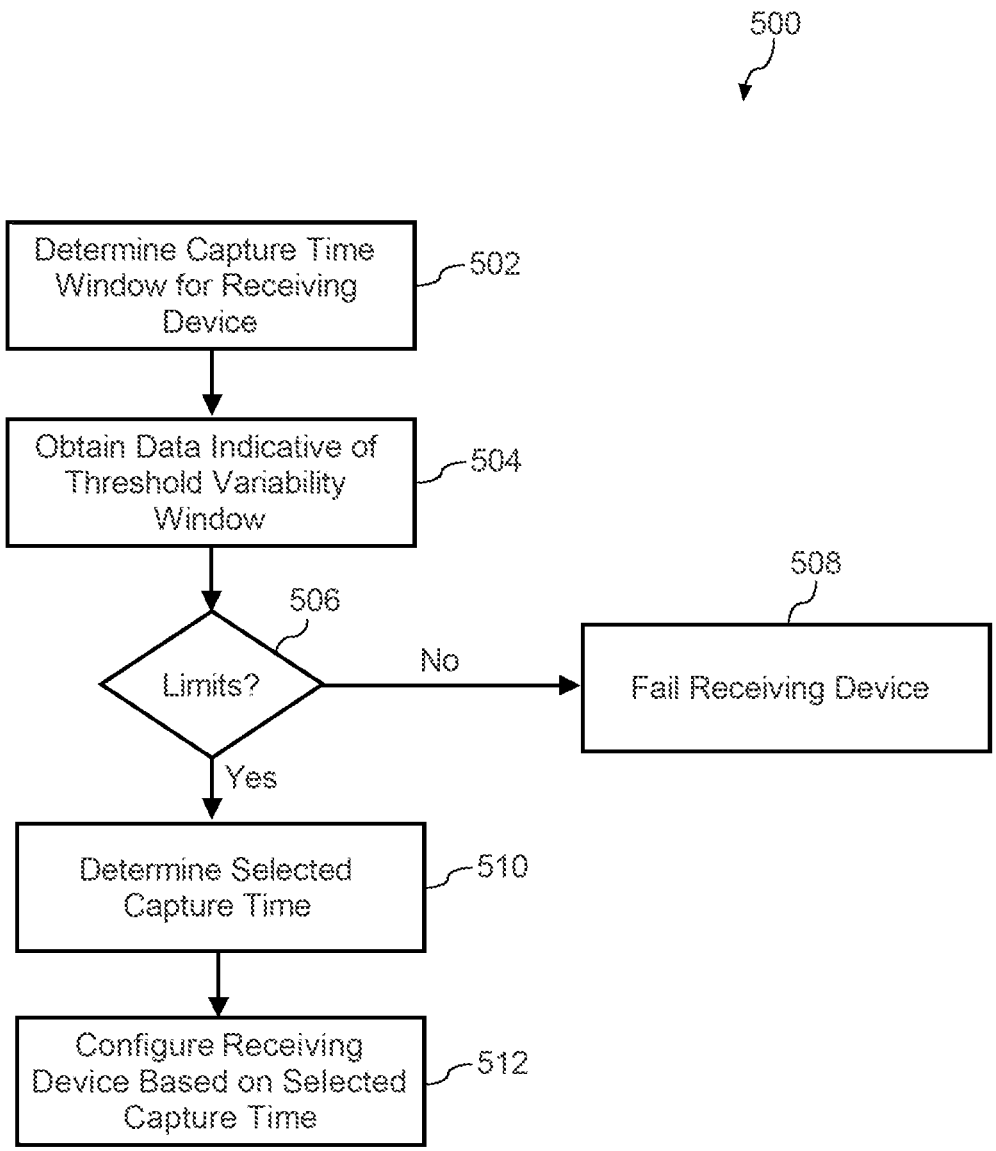
FIG. 9 depicts a flow diagram of an example method according to example embodiments of the present disclosure.

FIG. 9 depicts a flow diagram of an example method 500 according to example embodiments of the present disclosure. The method 500 may be implemented at least in part using, for instance, the system 100 discussed with reference to FIG. 1. FIG. 9 depicts operations performed in a particular order for purposes of illustration and discussion. Those of ordinary skill in the art, using the disclosures provided herein, will understand that various operations or steps of the method 500 or any of the other methods disclosed herein may be adapted, modified, rearranged, performed simultaneously, include operations not illustrated, and/or modified in various ways without deviating from the scope of the present disclosure.

At 502, the method 500 can include determining a capture time window for a receiving device. For instance, the method 300 discussed with reference to FIG. 4 can be used at least in part to determine a capture time window for a receiving device.

At 504, the method 500 can include obtaining data indicative of a threshold variability window. For instance, the data indicative of a threshold variability window determined in accordance with the method 400 discussed with reference to FIG. 7 can be obtained or accessed.

At 506, the method 500 can include performing a comparison of the capture time window for the receiving device with the threshold variability window to determine if it is within limits set forth by the threshold variability window. For instance, if the duration of the capture time window for the receiving device is not within limits (e.g., the duration of the capture time window is less than the duration of the threshold variability window), the method 500 can proceed to 508 where the receiving device and/or the source device is "failed" and taken out of production.

If the duration of the capture time window for the receiving device is within limits (e.g., the duration of the capture time window is not less than the duration of the threshold variability window), the method 500 can proceed to 510 to determine a selected capture time and to 512 to configure the receiving device based on the selected capture time in a manner similar to the operations discussed with reference to FIG. 4.

Figure 10:
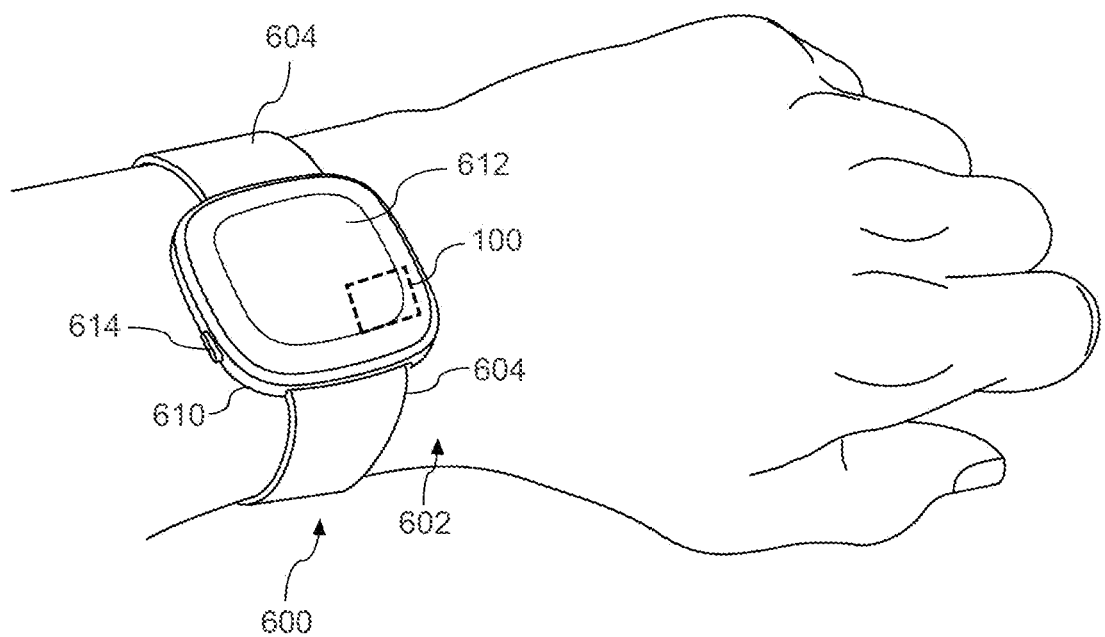
FIG. 10 depicts an example wearable device according to example embodiments of the present disclosure.

FIG. 10 depicts an example wearable computing device 600 that can include a system according to example embodiments of the present disclosure, such as system 100 illustrated in FIG. 1. As shown, the wearable computing device 600 can be worn, for instance, on an arm 602 (e.g., wrist) of a user. For instance, the wearable computing device 600 can include a band 604 and a housing 610. In some implementations, the housing 610 can include a conductive material (e.g., metal). In alternative implementations, the housing 610 can include a non-conductive material (e.g., a plastic material, a ceramic material).

The housing 610 can be coupled to the band 604. In this manner, the band 604 can be fastened to the arm 602 of the user to secure the housing 610 to the arm 602 of the user. Furthermore, the housing 610 can define a cavity for one or more electronic components (e.g., located on printed circuit boards) of the wearable computing device.

In some implementations, the wearable computing device 600 can include a display screen 612. The display screen 612 can display content (e.g., time, date, biometrics, etc.) for viewing by the user. In some implementations, the display screen 612 can include an interactive display screen (e.g., touchscreen or touch-free screen). In such implementations, the user can interact with the wearable computing device 600 via the display screen 612 to control operation of the wearable computing device 600.

In some implementations, the wearable computing device 600 can include one or more input devices 614 that can be manipulated (e.g., pressed) by the user to interact with the wearable computing device 600. For instance, the one or more input devices 614 can include a mechanical button that can be manipulated (e.g., pressed) to interact with the wearable computing device 600. In some implementations, the one or more input devices 614 can be manipulated to control operation of a backlight (not shown) associated with the display screen 612. The one or more input devices 614 can be configured to allow the user to interact with the wearable computing device 600 in any suitable manner. For instance, in some implementations, the one or more input devices 614 can be manipulated by the user to navigate through content (e.g., one or more menu screens) displayed on the display screen 612.

The wearable computing device 600 can include the system 100 (FIG. 1) according to example embodiments of the present disclosure. The system 100 can be incorporated within housing 610. Example aspects of the present disclosure are directed to controlling timing of data transfer between a processor and memory in the system 100 (e.g., controlling capture times).

Figure 11:
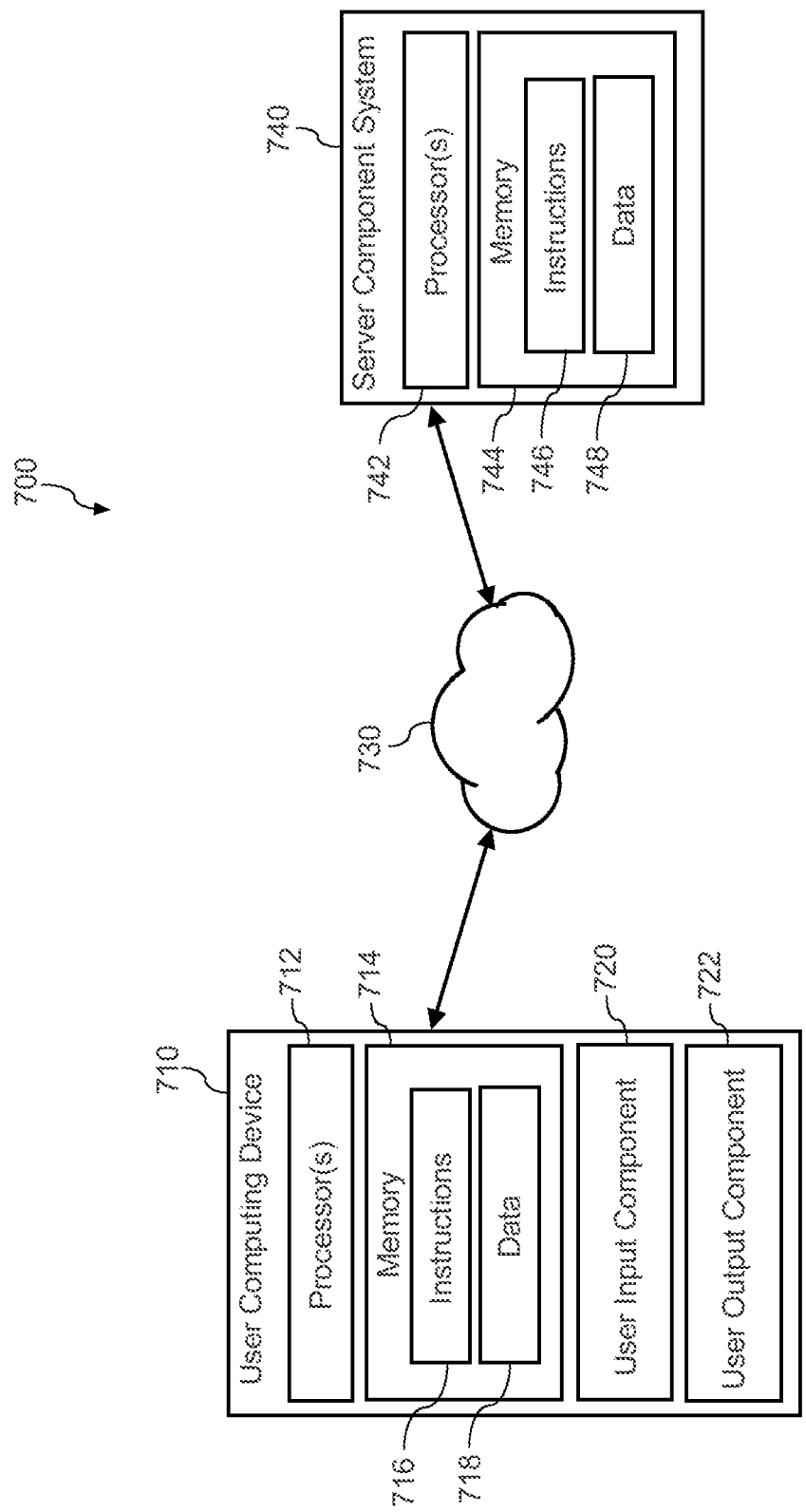
FIG. 11 depicts an example computing system according to example embodiments of the present disclosure.

FIG. 11 depicts an example computing system 700 according to example embodiments of the present disclosure. The computing system 700 can be used, for instance, to implement the method 400 of FIG. 7 or other aspects of any of the methods described herein. The system 700 includes a user computing device 710 and a server computing system 740 that are communicatively coupled over a network 730.

The user computing device 710 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 710 includes one or more processors 712 and a memory 714. The one or more processors 712 can be any suitable processing device (e.g., a processor core, a microprocessor, an ASIC, an FPGA, a controller, a microcontroller, etc.) and can be one processor or a plurality of processors that are operatively connected. The memory 714 can include one or more non-transitory computer-readable storage media, such as RAM, ROM, EEPROM, EPROM, flash memory devices, magnetic disks, etc., and combinations thereof. The memory 714 can store data 716 and instructions 718 which are executed by the processor 712 to cause the user computing device 710 to perform operations, such as any of the operations described herein.

The user computing device 710 can also include one or more user input components 720 that receives user input. For example, the user input component 720 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input. The user computing device 710 can also include a user output component 722. The user output component 722 can provide information and can include, for instance, a display screen, audio output device, haptic device, or other suitable device.

The server computing system 740 includes one or more processors 742 and a memory 744. The one or more processors 742 can be any suitable processing device (e.g., a processor core, a microprocessor, an ASIC, an FPGA, a controller, a microcontroller, etc.) and can be one processor or a plurality of processors that are operatively connected. The memory 744 can include one or more non-transitory computer-readable storage media, such as RAM, ROM, EEPROM, EPROM, flash memory devices, magnetic disks, etc., and combinations thereof. The memory 744 can store data 746 and instructions 748 which are executed by the processor 742 to cause the server computing system 740 to perform operations, such as any of the operations described herein.

In some implementations, the server computing system 740 includes or is otherwise implemented by one or more server computing devices. In instances in which the server computing system 740 includes plural server computing devices, such server computing devices can operate according to sequential computing architectures, parallel computing architectures, or some combination thereof.

The network 730 can be any type of communications network, such as a local area network (e.g., intranet), wide area network (e.g., Internet), or some combination thereof and can include any number of wired or wireless links. In general, communication over the network 7300 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

What is claimed is:

1. A method for time control for a data interface between a source device and a receiving device, the method comprising:
    performing, by the receiving device, a capture time sweep process, wherein the capture time sweep process comprises performing a plurality of test data transfers at a plurality of different capture time settings via the data interface;
    determining a capture time window based at least in part on the capture time sweep process, the capture time window defined as a duration between a first capture time and a second capture time, wherein the first capture time is defined based at least in part on an earliest capture time where a first threshold of a plurality of test data transfers are without error, wherein the second capture time is defined based at least in part on a latest capture time where a second threshold of a plurality of test data transfers are without error;
    determining a selected capture time, the selected capture time being a time between the first capture time and the second capture time; and
    configuring the receiving device to control data transfer across the data interface based at least in part on the selected capture time.

2. The method of claim 1, wherein the method further comprises:
    obtaining data associated with a threshold variability window for the receiving device; and
    failing the receiving device based at least in part on a comparison of the capture time window with the threshold variability window.

3. The method of claim 2, wherein the data associated with the threshold variability window is generated using a test process, the test process comprising:
    performing a plurality of test capture time sweep processes, one or more of the plurality of test capture time sweep processes being performed by a first receiving device of a first device among a plurality of devices, one or more of the plurality of test capture time sweep processes being performed by a second receiving device of a second device among the plurality of devices, two or more of the plurality of test capture time sweep processes being associated with a different operating condition, and each test capture time sweep process comprising performing a plurality of test data transfers at a plurality of different capture time settings;
    determining a test capture time window for each of the plurality of test capture time sweep processes, each test capture time window defined as a duration between first test capture time and a second test capture time, wherein the first test capture time is defined based at least in part on an earliest test capture time where a first test threshold of a plurality of test data transfers are without error, wherein the second test capture time is a latest capture time where a second test threshold of a plurality of test data transfers are without error;
    determining a first variability among each of the first test capture times;
    determining a second variability among each of the second test capture times; and
    determining the threshold variability window based at least in part on the first variability and the second variability.

4. The method of claim 3, wherein the different operating conditions are associated with different operating temperatures or different operating voltages.

5. The method of claim 1, wherein prior to performing a capture time sweep process, the method comprises:
    erasing data stored at the source device;
    writing test data to the source device at a test frequency, the test frequency being less than an operating frequency at the source device; and
    reading the test data at the receiving device at the test frequency.

6. The method of claim 1, wherein the capture time sweep process comprises:
    adjusting a capture time for the plurality of test data transfers to a first capture time;
    performing the plurality of test data transfers based at least in part on the first capture time;
    adjusting the capture time for the plurality of test data transfers to a second capture time; and
    performing the plurality of test data transfers based at least in part on the second capture time.

7. The method of claim 6, wherein the capture time comprises a transmit time.

8. The method of claim 1, wherein the plurality of test data transfers performed for each capture time includes about 500 test data transfers or greater.

9. The method of claim 1, wherein the first threshold is 100% of the plurality of test data transfers are without error and the second threshold is 100% of the plurality of test data transfers are without error.

10. The method of claim 1, wherein the receiving device comprises a processor and the source device comprises a memory device.

11. The method of claim 10, wherein the memory device comprises NOR, NAND, MRAM, pSRAM, SRAM, eMMC, or DRAM.

12. The method of claim 10, wherein the data interface comprises a clocked interface.

13. The method of claim 12, wherein an operating frequency of the data interface is about 8 MHz or greater.

14. The method of claim 1, wherein the plurality of test data transfers comprise at least one of a read operation or a write operation.

15. A system, comprising:
    a processor;
    a memory; and a data interface between the processor and the memory; wherein the processor is configured to capture data during a data transfer operation with the memory via the data interface based at least in part on a selected capture time, the selected capture time is defined as a time between a first capture time and a second capture time, the first capture time being defined based at least in part on an earliest capture time where a first threshold of a plurality of test data transfers are without error, and the second capture time being a latest capture time where a second threshold of a plurality of test data transfers are without error, and a duration between the first capture time and the second capture time corresponds to a capture time window which is based at least in part on a capture time sweep process comprising performing a plurality of test data transfers at a plurality of different capture time settings via the data interface.

16. The system of claim 15, wherein the data interface comprises a clocked interface.

17. The system of claim 15, wherein an operating frequency of the data interface is about 8 MHz or greater.

18. The system of claim 15, wherein the system is part of a wearable computing device.

19. A method for configuring a processor to be used in a data transfer system, the data transfer system comprising the processor, a memory, and a data interface between the processor and the memory, the method comprising:

performing a plurality of test capture time sweep processes, one or more of the plurality of test capture time sweep processes being performed by a first processor of a first device among a plurality of devices, one or more of the plurality of test capture time sweep processes being performed by a second processor of a second device among the plurality of devices, two or more of the plurality of test capture time sweep processes being associated with a different operating condition, and each test capture time sweep process comprising performing a plurality of test data transfers at a plurality of different capture time settings;

determining a test capture time window for each of the plurality of test capture time sweep processes, each test capture time window defined as a duration between first test capture time and a second test capture time, wherein the first test capture time is defined based at least in part on an earliest test capture time where a first test threshold of a plurality of test data transfers are without error, wherein the second test capture time is a latest capture time where a second test threshold of a plurality of test data transfers are without error;

determining a first variability among each of the first test capture times;

determining a second variability among each of the second test capture times;

determining a threshold variability window based at least in part on the first variability and the second variability; and configuring the processor to be used in the data transfer system based at least in part on the threshold variability window to control data transfer across the data interface.

20. The method of claim 19, wherein the different operating conditions are associated with different operating temperatures or different operating voltages.

* * * * *